(12) United States Patent
Trummer

(10) Patent No.: US 10,996,045 B2
(45) Date of Patent: May 4, 2021

(54) DISTANCE MEASURING DEVICE, IN PARTICULAR FOR DIELECTRIC AND METALLIC TARGET OBJECTS

(71) Applicant: ASTYX GmbH, Ottobrunn (DE)

(72) Inventor: Stefan Trummer, Strasslach-Dingharting (DE)

(73) Assignee: Astyx GmbH, Ottobrunn (DE)

( * ) Notice: Subject to any disclaimer, the term of this patent is extended or adjusted under 35 U.S.C. 154(b) by 308 days.

(21) Appl. No.: 15/313,483

(22) PCT Filed: May 21, 2015

(86) PCT No.: PCT/EP2015/001039
§ 371 (c)(1),
(2) Date: Jun. 8, 2017

(87) PCT Pub. No.: WO2015/176822
PCT Pub. Date: Nov. 26, 2015

(65) Prior Publication Data
US 2017/0307350 A1    Oct. 26, 2017

(30) Foreign Application Priority Data

May 23, 2014 (DE) ..................... 10 2014 007 643.1

(51) Int. Cl.
*G01B 7/14*    (2006.01)
*H01P 7/10*    (2006.01)
(Continued)

(52) U.S. Cl.
CPC .............. *G01B 7/14* (2013.01); *G01B 15/00* (2013.01); *H01P 7/10* (2013.01); *H01Q 9/0492* (2013.01)

(58) Field of Classification Search
CPC .. G01B 15/00; G01B 7/14; H01P 7/10; H01P 7/06; H01P 1/207; H01P 1/2082;
(Continued)

(56) References Cited

U.S. PATENT DOCUMENTS 4,706,052 A    11/1987  Hattori et al.
5,059,929 A    10/1991  Tanaka
(Continued)

FOREIGN PATENT DOCUMENTS

CN    1129995    8/1996
CN    1472842    2/2004
(Continued)

OTHER PUBLICATIONS

European Patent Office, International Search Report and Written Opinion for PCT/EP2015/001039 dated Sep. 17, 2015.
(Continued)

*Primary Examiner* — Giovanni Astacio-Oquendo
*Assistant Examiner* — Adam S Clarke
(74) *Attorney, Agent, or Firm* — Medley, Behrens & Lewis, LLC

(57) ABSTRACT

Disclosed is a distance measuring device, in particular for dielectric or metallic target objects, said device comprising a sensor with a resonance chamber and a resonance structure. The resonance structure has an element consisting of a dielectric material which has a narrowing at the edge, the resonance frequency of the resonance chamber being dependent on the distance between the element and a target object.

33 Claims, 23 Drawing Sheets

(51) Int. Cl.
*G01B 15/00* (2006.01)
*H01Q 9/04* (2006.01)

(58) Field of Classification Search
CPC ... H01P 1/2084; H01P 1/2086; H01Q 9/0492; H01Q 9/0485
See application file for complete search history.

(56) References Cited

U.S. PATENT DOCUMENTS

| | | | |
|---|---|---|---|
| 6,445,191 | B1 | 9/2002 | Trummer |
| 6,600,394 | B1* | 7/2003 | Wang .................. H01P 7/10 333/231 |
| 7,173,435 | B1 | 2/2007 | Fay et al. |
| 2007/0229197 | A1* | 10/2007 | Okano ................ H03B 5/1876 333/219 |
| 2009/0140751 | A1* | 6/2009 | Takeuchi ............. G01B 15/02 324/635 |
| 2011/0181300 | A1* | 7/2011 | Bowring ............... G01S 7/411 324/637 |
| 2012/0212386 | A1 | 8/2012 | Massie et al. |
| 2015/0048843 | A1* | 2/2015 | Hinken ............... G01B 15/02 324/635 |
| 2015/0263399 | A1* | 9/2015 | Kawamura ........... H01P 1/208 333/208 |
| 2016/0124083 | A1* | 5/2016 | Fericean ............... G01S 13/36 342/127 |
| 2017/0368892 | A1* | 12/2017 | Heuermann .......... B60C 11/246 |

FOREIGN PATENT DOCUMENTS

| | | |
|---|---|---|
| DE | 19618710 | 11/1996 |
| DE | 102008061227 | 7/2010 |
| EP | 1000314 | 4/2002 |
| JP | S61139102 | 6/1986 |
| JP | S61139103 | 6/1986 |
| JP | H02168702 | 6/1990 |
| JP | 2001512229 | 8/2001 |

OTHER PUBLICATIONS

International Preliminary Report on Patentability for PCT/EP2015/001039 dated Nov. 29, 2016.
JP Office Action in Japanese Application. No. 2017513317, dated Mar. 12, 2019, 5 pages (with English translation).
CN Office Action issued in Chinese Application No. 201580040017.2, dated Jan. 16, 2019, 20 pages.
CN Office Action issued in Chinese Application No. 201580040017.2, dated Mar. 22, 2019, 10 pages (with English translation).
CN Office Action in Chinese Appln. No. 201580040017.2, dated Jun. 28, 2019, 10 pages, (with English translation).
DE Search Report in German Appln No. 102014007643, dated Feb. 2, 2015, 13 pages, (with English Translation).
CN Office Action in Chinese Appln. No. 201580040017.2, dated Jan. 19, 2020, 13 pages (with English translation).
EP Office Action in European Appln. No. 15730056.7, dated Jan. 31, 2020, 5 pages.
EP Office Action in European Appln. No. 15730056.7, dated Jun. 11, 2019, 6 pages.
JP Notice of Allowance in Japanese Appln. No. 2017513317, dated Jun. 18, 2019, 5 pages (with English translation).
CN Office Action in Chinese Appln. No. 201580040017.2. dated Jul. 23, 2020, 10 pages (with English translation).

* cited by examiner

Simulation Targets:
Target frequency change, high quality, small wall currents large mode clarity range, simple coupling Mode Former Mode: H011 (TE011)
Material: Ceramic E2000; er = 37
Sensor Diameter: M18

E-Field

Electric Energy Density:

Surface Current:

Mode of Opperation

Cross-Section E Field

Target Distance = 0.5 mm:  Without Target:

Reflective: Metal Target $f_R > f0$

Transmitting: Dielectric Target er = 10

$f_T < f0$ $f0$

Reduction of Sensor Diameter

Increase of Sensor Diameter

*Mode of Operation H111/E110*

*Cross-Section E-Field*

Without a Target

Target Distance 5mm:

DISTANCE MEASURING DEVICE, IN PARTICULAR FOR DIELECTRIC AND METALLIC TARGET OBJECTS

CROSS-REFERENCE TO RELATED APPLICATIONS

This application is a continuation of International App. No. PCT/EP2015/001039, filed May 21, 2015, which is a continuation of German App. No. DE 10 2014 007 643.1, filed May 23, 2014.

TECHNICAL FIELD

The invention relates to a distance measuring device, in particular for dielectric and metallic target objects.

BACKGROUND

EP 1 000 314 B discloses a distance measuring device comprising a sensor and evaluation electronics in which the sensor has a resonator in the form of a cavity resonator that is filled with a fluid material, e.g. air or inert gas.

Alternatively, inductive, capacitive, optical and ultrasonic sensors are used for measurements in the close range.

Inductive sensors are based on the principle of alternating magnetic fields and work exclusively with metallic targets, the material and its size having to be known in order to obtain a high degree of measuring accuracy. Inductive sensors that are fitted directly next to one another influence one another because their detection range comprises an angle range of up to 180°. In addition, static and dynamic magnetic fields can have a negative impact upon the functionality of the sensor. The measuring accuracy also fluctuates with the temperature.

With capacitive sensors, for a reliable distance measurement both the material and the object size of the target must be known. Furthermore, the measuring accuracy is influenced by the air humidity, the temperature and electromagnetic fields.

Optical sensors can only be used in industrial applications to a limited extent because their functionality is not guaranteed in contaminated environments.

With ultrasonic sensors the measuring accuracy is greatly dependent upon the environmental conditions such as e.g. the air humidity and the temperature.

SUMMARY

With the invention a distance measuring device according to claim 1 is devised that can be used in particular for dielectric or metallic targets, but also for other target materials such as e.g. coated plastic materials, and that is characterised by very good measuring properties.

Furthermore, with the invention a device, e.g. a distance measuring device, according to claim 16 is devised that is characterised by special resonance properties or resonance modes.

Some embodiments are specified in the sub-claims.

In one, a number of or all of the exemplary embodiments of the distance measuring device according to the invention or of the distance measuring method according to the invention one is offered the advantage that a considerable increase in range is achieved, i.e. the measurable distance between the sensor and the target object is clearly increased e.g. by the factor of 2 to 3 in comparison to inductive proximity sensors of the same size.

Desired design requirements can also be met at the same time here, such as for example mode purity in the largest possible frequency range; easy coupling and decoupling of the electromagnetic waves into the resonator; and/or small wall currents of the sensor at the boundaries between the dielectric material and air.

In one, a number of or all of the exemplary embodiments of the distance measuring device according to the invention or of the distance measuring method according to the invention a sensor is used that can be in the form e.g. of a factor 1 sensor. This type of sensor can have the same measuring curve with all targets if these are, for example, metals, and the size of the target surface area does not significantly fall short of the diameter or the sensor surface area of the sensor.

With one, a number of or all of the exemplary embodiments, due to special composition structures, this sensor can have a small amount of installation spring, and is therefore only slightly displaced height-wise upwards or downwards, or not at all, with respect to the components surrounding the sensor.

According to one aspect of the invention a distance measuring device is provided that can be used in particular for dielectric or metallic target objects and comprises a sensor with a resonance chamber and a resonance structure, the resonance structure having an element consisting of a dielectric material which has a narrowing at the edge. The resonance frequency of the resonance chamber is dependent on the distance between the element and a target object.

The narrowing at the edge can be a circumferential, e.g. rotationally symmetrical, narrowing, e.g. in the form of a recess or a groove, that can have, for example, a rectangular cross-section.

The element can be angular or cylindrical in form.

The narrowing can have e.g. a height of 5 to 25% or 10 to 20% or approximately 15% of the element height, or be 0.2 to 1.0 mm, or optionally 0.5 to 0.7 mm, or approximately 0.6 mm high.

Furthermore or alternatively, the narrowing can have, for example, a depth of 5 to 25% or 10 to 20% or approximately 15% of the element width, or be 1.0 to 3.8 mm, or optionally 1.6 to 3.2 mm or approximately 2.4 mm deep. The narrowing can be positioned in the upper third of the element above an upper sleeve edge, if this is provided.

The lower region of the element, optionally including the edge surfaces of the narrowing, can be entirely, partially or predominantly metallised, and plastic can be injection moulded around the outer and/or the upper region of the element.

The resonance structure of the sensor can be disposed at least partially within a sleeve, and the element can be positioned within the sleeve so that an upper region of the element is located partially above the sleeve.

In one, a number of or all of the exemplary embodiments of the distance measuring device a signal generator for generating an optionally frequency-modulated signal can be provided that is coupled into the resonance structure, a signal being decoupled at another point of the resonance structure with the given resonance.

The distance measuring device can comprise means for mixing down a signal decoupled from the resonance structure into a baseband, for amplifying it, for filtering it and/or for converting it from analogue to digital.

The distance measuring device can contain at least one oscillator for generating a signal coupled into the resonance structure and a local oscillator signal (LO signal) and a mixer to which the signal decoupled from the resonance structure and the local oscillator signal can be delivered.

The resonance structure can be formed in such a way that it can be excited electrically and/or magnetically.

In one or a number of exemplary embodiments or in a further aspect of the invention a device can be geometrically designed with a resonance structure in such a way that a mode is formed in the resonance structure that is at least predominantly in the form of an H111 or a TE111 and an H011 or a TE011 mode. This can be used for measuring distances, but also for other purposes.

A mode can contain a portion the form of which is distinct like a TM mode.

The narrowing at the edge of the sensor can act like a throttle and transform short circuit properties into idling properties.

In one or a number of exemplary embodiments, in order to achieve rotationally symmetrical sensor properties, at least two resonator coupling points can be provided that can be offset geometrically by a specific angle or distance. Signals with a specific phase difference of, for example, 90°, optionally with the same amplitude, can be fed into the at least two resonator coupling points so that circulation of the mode is produced.

With another aspect of the invention a distance measuring method, in particular for dielectric or metallic target objects, is provided that has a sensor that comprises a resonance chamber and a resonance structure, the resonance structure having an element consisting of a dielectric material which has a narrowing at the edge, a resonance frequency of the resonance chamber being dependent on the distance between the element and a target object. A signal can be fed into the resonance structure at one point, and at another point of the resonance structure a signal can be decoupled with a given resonance.

In one method, e.g. a distance measuring method, a or the resonance structure is designed geometrically such that a mode is formed in the resonance structure that is at least predominantly in the form of an H011 or a TE011 and/or an H111 or a TE111 mode.

A rotationally symmetrical sensor property can be achieved in that a signal is fed in via a first resonator coupling point and is decoupled via a second resonator coupling point that is offset to the first positioned resonator coupling point. If signals with a phase difference of for example 90°, optionally with the sample amplitude, are fed into the at least two resonator coupling points or resonator connection points, circulation of the mode is produced.

In the following the invention is described in more detail with reference to exemplary embodiments shown in the drawings.

DETAILED DESCRIPTION

In one, a number of or all of the exemplary embodiments according to FIG. 1 the principle of the sensor consists of determining the frequency of a resonance chamber that is defined by a resonance structure located within the sensor and a target that is a specific distance away from the sensor that is to be recorded, which distance is also called the target distance in the following.

The target distance can be determined on the basis of the dependency of the resonance frequency upon the target distance. In this connection the resonance structure can be coupled to or be acted on by a frequency-modulated signal, and at another point of the resonance structure, with a given resonance, a signal can be decoupled. The decoupled signal can then be mixed down into the baseband, can be amplified, filtered and/or be converted from analogue to digital.

Figure 1:
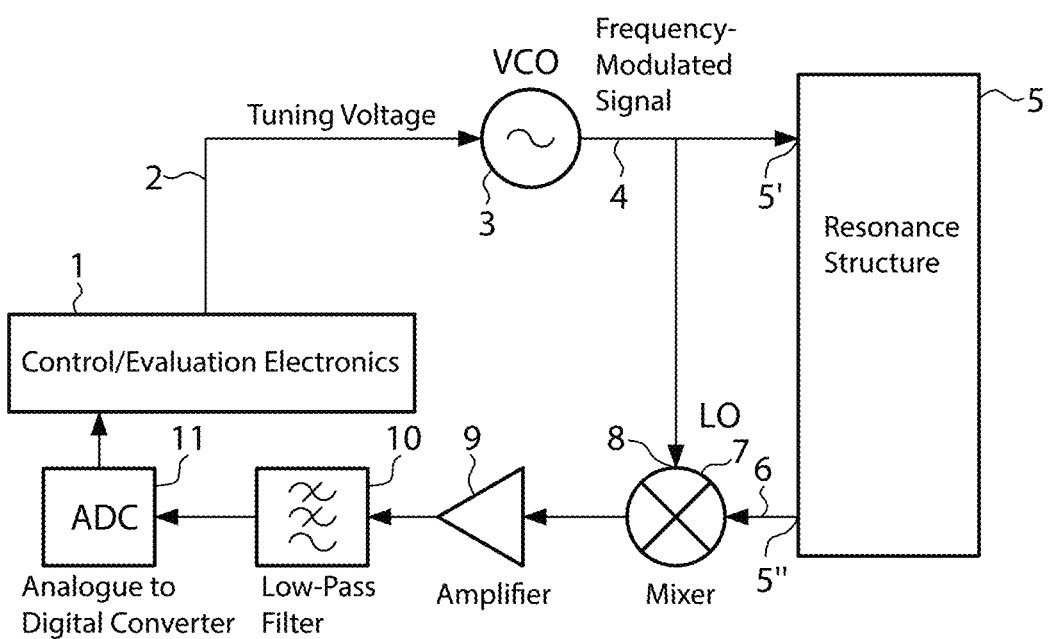
FIG. 1 shows a block diagram of an exemplary embodiment of a distance measuring device according to the invention.

As shown in FIG. 1, in the exemplary embodiment shown a control/evaluation device 1, e.g. in the form of an electronic circuit, is provided that applies a control signal, e.g. in the form of tuning voltage, to a voltage-controlled oscillator, VCO, 3 via a line 2. The frequency-modulated signal emitted by the VCO 3 is applied via a line 4 to an input connection 5' of a resonance structure 5 as an excitation signal.

A output signal is taken from the resonance structure 5 at another connection 5", which output signal is applied via a line 6 to a mixer 7 to which the signal occurring on the line 4 and fed into the resonance structure 5 is fed via a second input 8 as a local oscillator signal.

In one, a number of or all of the exemplary embodiments the output signal of the mixer 7 is conveyed via an amplifier 9, a low-pass filter 10 and/or an analogue to digital converter 11 and is then fed via an input into the control and evaluation device 1.

In many exemplary embodiments the local oscillator signal (LO signal) applied to the input 8 of the mixer 7 can be generated by an oscillator other than the VCO 3, but in the exemplary embodiment according to FIG. 1 and other exemplary embodiments is generated by the same oscillator 3 as the coupling signal at the input 5. This mixing principle makes amplitude sensitivity possible here and prevents ambiguities in resonance frequencies and couplings due to structurally identical sensors that are positioned opposite one another.

In one, a number of or all of the exemplary embodiments the sensor can have the following structure. The sensor has a resonance structure 5 that corresponds to the illustration of FIG. 2, the dimensions relating here to typical dimensions of a sensor of M18 size (metric ISO thread as the thread size for a screw-in sensor), and can be modified or varied as one wishes according to the requirement and size. In the exemplary embodiment that is illustrated, the sensor is made in the form of a round disc with a thickness of approx. 4.2 mm and a diameter of 18 mm.

In the exemplary embodiment that is illustrated the resonance structure 5 consists mainly of an element 14 made of dielectric material that is optionally cylindrical in form, a target object 20 and an air area 19 between the two objects 14, 20. With this arrangement high resonance frequencies can be achieved with small geometric ratios.

In one, a number of or all of the exemplary embodiments the dielectric material of the element 14 has a narrowing 18, for example a circumferential narrowing at the edge and/or that is rotationally symmetrical, in the form of an indentation or a recess such as for example a groove at the side edge. The lower region of the element 14 can be predominantly or entirely metallised, i.e. it can have metallisation 15. Optionally, the lower side surfaces of the element 14 and/or the boundary surfaces of the narrowing 18, i.e. the surfaces running parallel to the lower side of the sensor 5 and the inner edge side of the recess 18 running at right angles to the latter, can also be predominantly or entirely metallised, i.e. have the metallisation 15. The element 14 can be surrounded by a plastic 16, such as for example a resin, e.g. this can be injection moulded around it, which plastic covers not only all of the side regions of the element including the inside of the recess 18, but also covers the upper side of the element 14 with a smaller layer thickness.

In the lower region the element 14 is surrounded by a sensor sleeve 17 and is located in the upper region, partially above the sensor sleeve 17. The height of the sensor sleeve can e.g. be one to two thirds of the element height, but optionally ends below the recess 18 and can, for example, be approximately half the height of the element 14.

In one, a number of or all of the exemplary embodiments the narrowing 18 can have a rectangular cross-section, the narrowing being able to have a height of 5 to 25% or 10 to 20% or approximately 15% of the element height, or be e.g. 0.2 to 1.0 mm, or optionally 0.5 to 0.7 mm, or approximately 0.6 mm high.

Furthermore, the narrowing 18 can have a depth of 5 to 25% or 10 to 20% or approximately 15% of the element width, or be e.g. 1.0 to 3.8 mm, or optionally 1.6 to 3.2 mm or approximately 2.4 mm deep.

In the exemplary embodiment that is illustrated the narrowing 18 is formed on the outer edge and is positioned e.g. in the upper half or in the upper third of the element 14.

Figure 3:
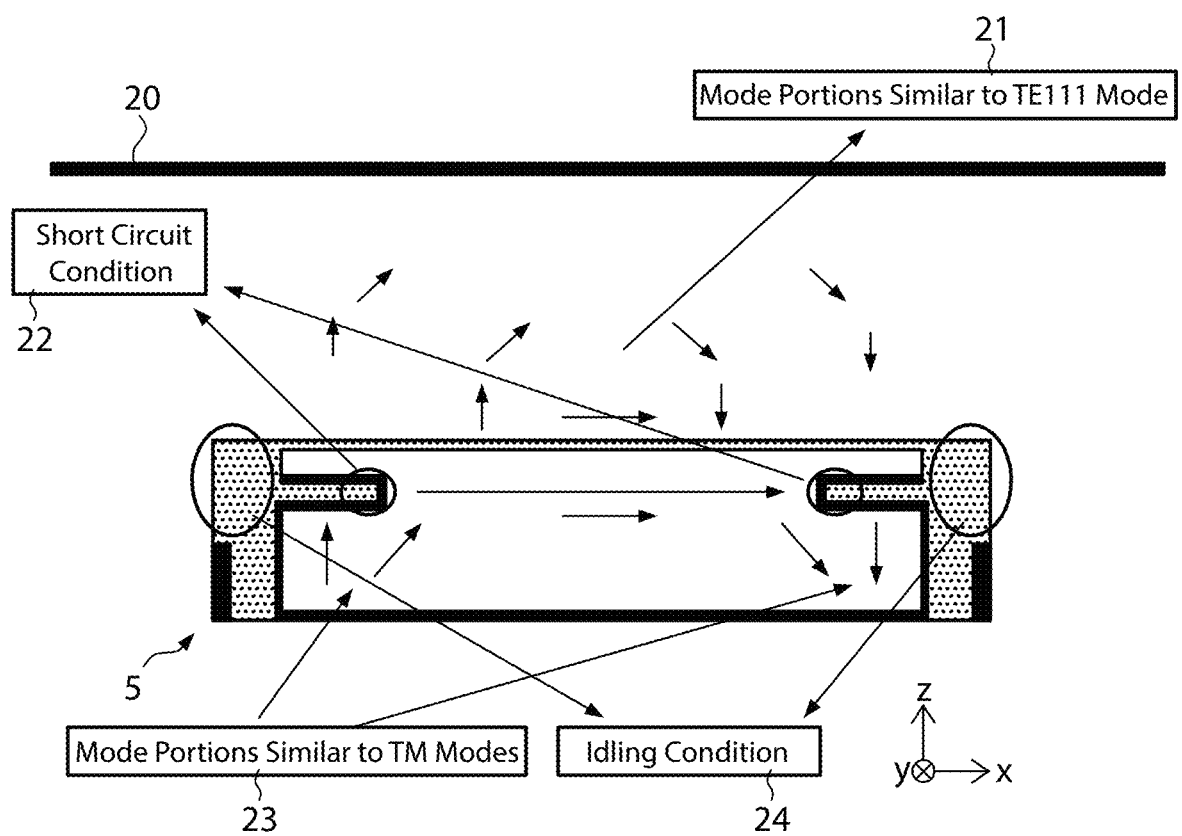
FIG. 3 shows mode portions in the resonator structure according to FIG. 2.

The resonance structure 5 is electrically or magnetically excited and is designed geometrically such that, in accordance with FIG. 3, a mode is formed in the resonance structure 5 that can predominantly be in the form of a TE111 mode. In addition, the mode has a portion the form of which is distinct like a TM mode. At the z position of the groove (i.e. the upper horizontal boundary surface of the recess 18 according to the illustration in the drawings) the electric field in the resonator 5 forms its strongest field amount-wise. At the same time the wall currents form mainly at the edge of the element 14, i.e. of the dielectric material on the inside of the groove or recess 18. In this way disruptive wall currents on the sensor surface are prevented. Outwardly, towards the sensor edge, the recess 18 (groove) acts like a throttle and transforms short circuit properties into idling properties that minimise field portions around the sensor head. These are additionally reduced by the E mode-type portions forming beneath the recess 18.

Figure 4:
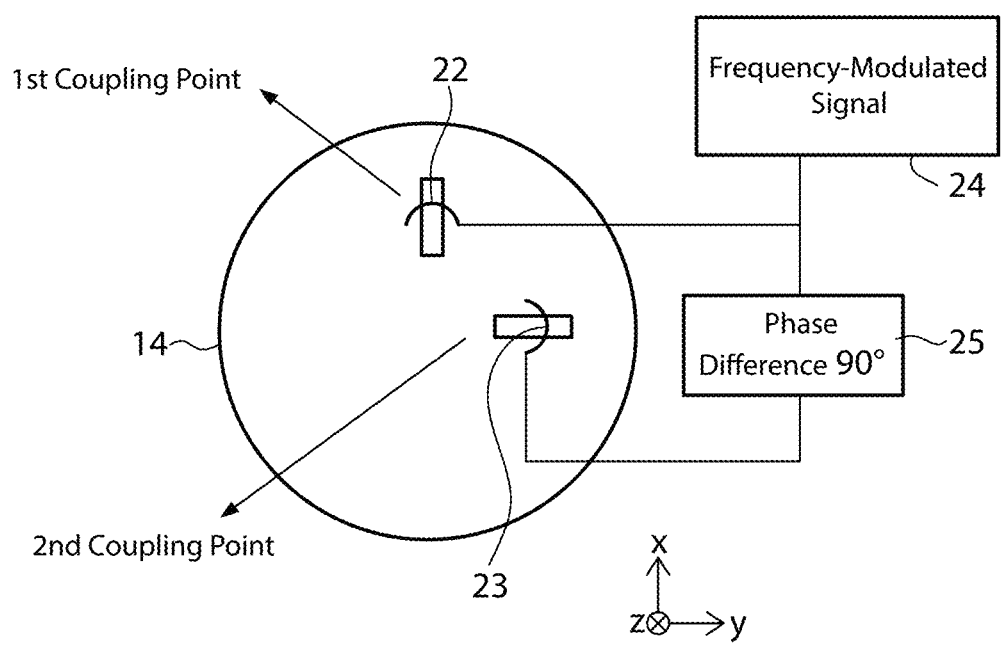
FIG. 4 shows a block diagram of an exemplary embodiment of a distance measuring device according to the invention working with circular mode.

In one, a number of or all of the exemplary embodiments rotationally symmetrical sensor properties can be achieved by circulating the mode described above. For this purpose, in accordance with FIG. 4, at least two resonator coupling points 22, 23 are provided that are geometrically offset by 90° and the signals of which are fed in with the same amplitude, but with a phase difference of 90°. FIG. 4 shows a bottom view of the element 14, i.e. in the z direction, as indicated by the coordinate arrows. The frequency-modulated signal 24 generated by the VCO 3 is applied directly to the first coupling point 22 and to a 90° phase shifter 25 the output signal of which, displaced by 90°, is applied to the second coupling point 23.

Figure 5:
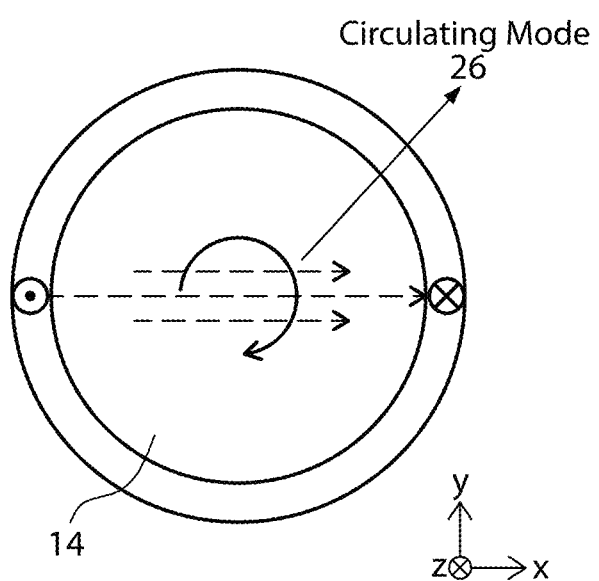
FIG. 5 shows a simplified illustration of the circular or circulating mode.

According to FIG. 5 a right- or left-circular mode 26 is thus formed. FIG. 5 shows a top view onto the element 14.

Figure 2:
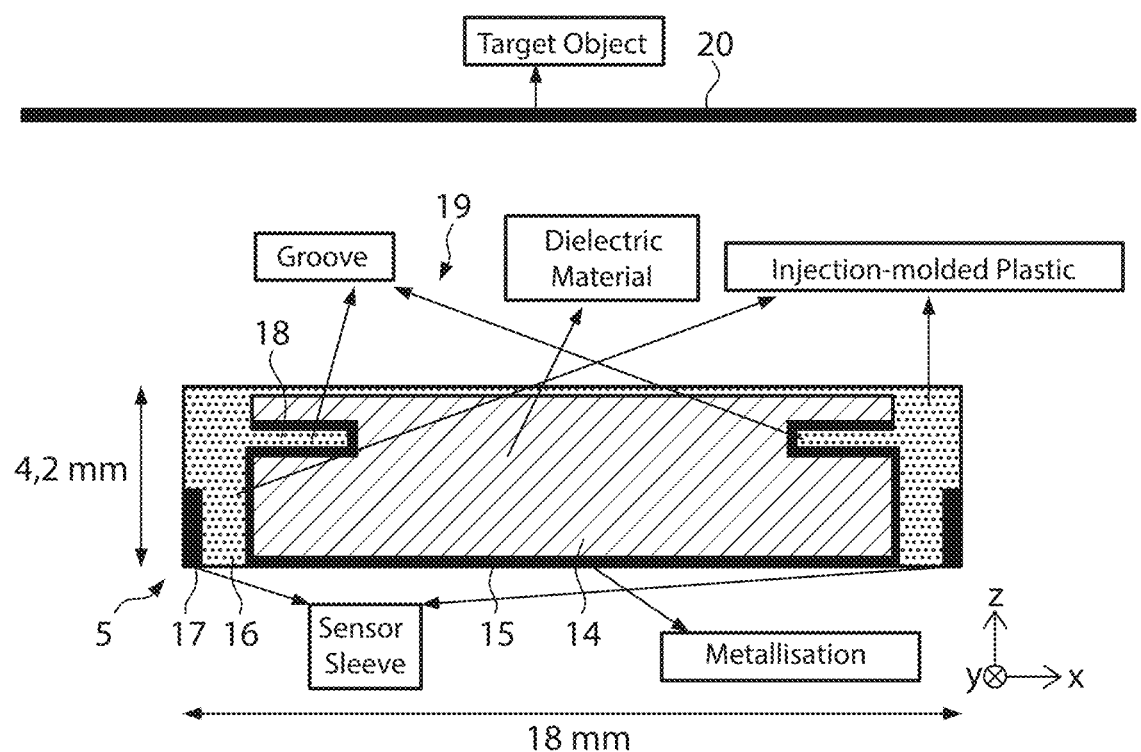
FIG. 2 shows a sectional view of an embodiment of a resonator structure that can be used in the distance measuring device or distance measurement according to the invention.
Figure 6:
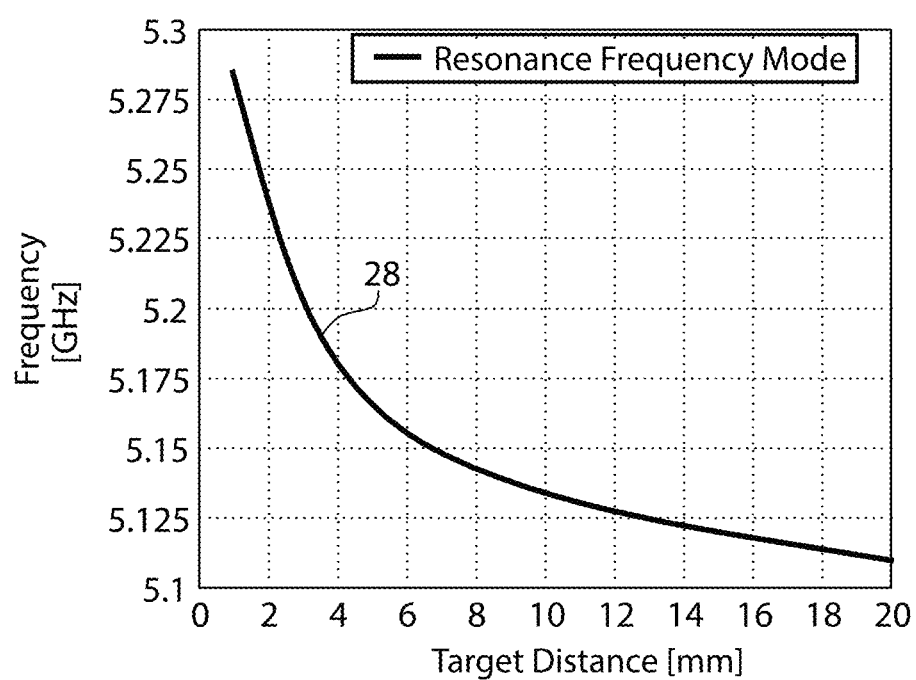
FIG. 6 shows a frequency response of the resonance frequency over the target distance.

FIG. 6 shows, as an example for the arrangement according to FIG. 2, a frequency curve 28 that illustrates the change of the resonance frequency upon changing the target distance of a metallic target 20. A particular feature of the curve 28 is a relatively linear constant frequency change over the target distance. This is determined by the mode that is used and that mainly consists of E mode-type portions and of H111 mode-type portions. The latter portions are more distinct and are crucial for the resonance frequency change over the target distance and, due to the field structure and the relatively low resonance frequency, are particularly suitable for measurements, even with large distances.

In FIG. 6 the target distance in mm is plotted on the axis of abscissas, and the frequency in GHz is plotted on the axis of ordinates.

As can be seen from FIG. 6, distance measurements for the sensor size M18 can be reliably taken over a very wide range here of less than 1 mm to more than 20 mm.

Another advantage of the sensor is the distance measurement for dielectric targets. Field portions penetrate into the dielectric target here, and due to the higher field concentration in the target and the permittivity difference between air and the target a resonance frequency shift over the target distance results that differs from metallic targets. This effect depends on the permittivity value, the thickness and the high frequency properties of the material, and can be used for measuring distance or for determining material.

In one, a number of or all of the exemplary embodiments a or the resonance structure can be designed geometrically such that a mode forms in the resonance structure that is at least predominantly in the form of an H111 mode. A new type of generator or measuring principle with a very large range is created by the H111 mode. This generator or measuring principle can be used for a measuring device, e.g. a distance measuring device or for distance measurement, but also for other purposes. It is well known that H and E modes are the German designations, whereas TM and TE are the corresponding American designations, and so e.g. "H111=TE111" and "E110=TM110".

FIGS. 7 to 23 show simulation structures and results for a resonance structure 5 in exemplary embodiments of the distance measuring device according to the invention, such as for example a ceramic resonator, e.g. in a dimmer 30, with resonance frequency, quality and switching distance, as well as frequency curves and field profiles.

Figure 7:
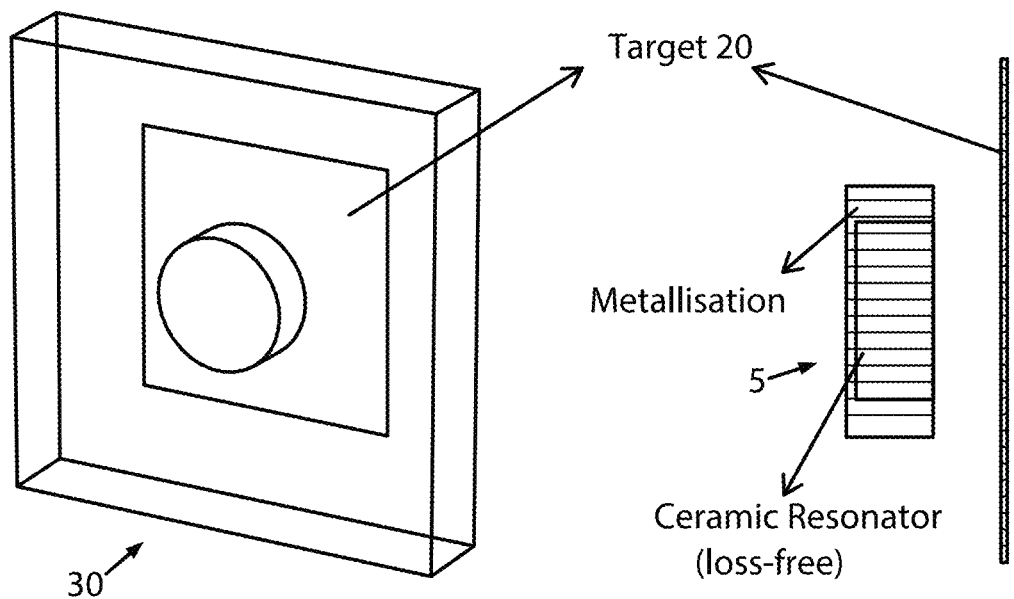
FIGS. 7 to 23 show simulation structures and results as well as frequency curves and field profiles in exemplary embodiments of the distance measuring device according to the invention.

FIG. 7 lists the simulation targets such as target frequency change, high quality, small wall currents, large mode clarity range and simple coupling.

Figure 8:
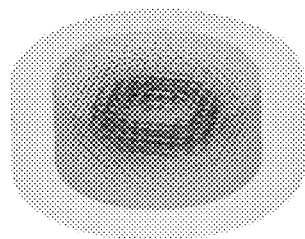
Figure 8:
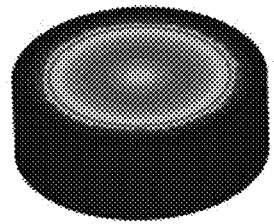
Figure 8:
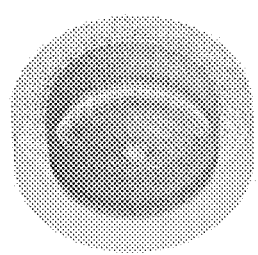

FIG. 8 shows mode formers for H011 with E-field, electric energy density and surface current.

Figure 9:
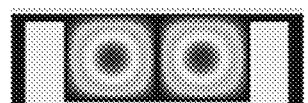
Figure 9:
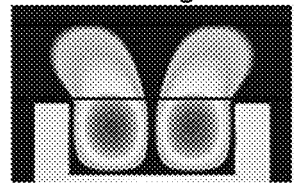
Figure 9:
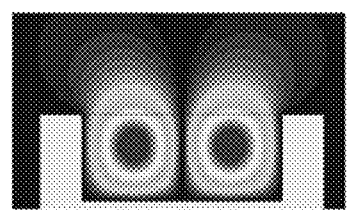

FIG. 9 shows the mode of operation with a reflective or transmitting target or without a target. The target is also to be understood to mean the target or target object here.

Figure 10:
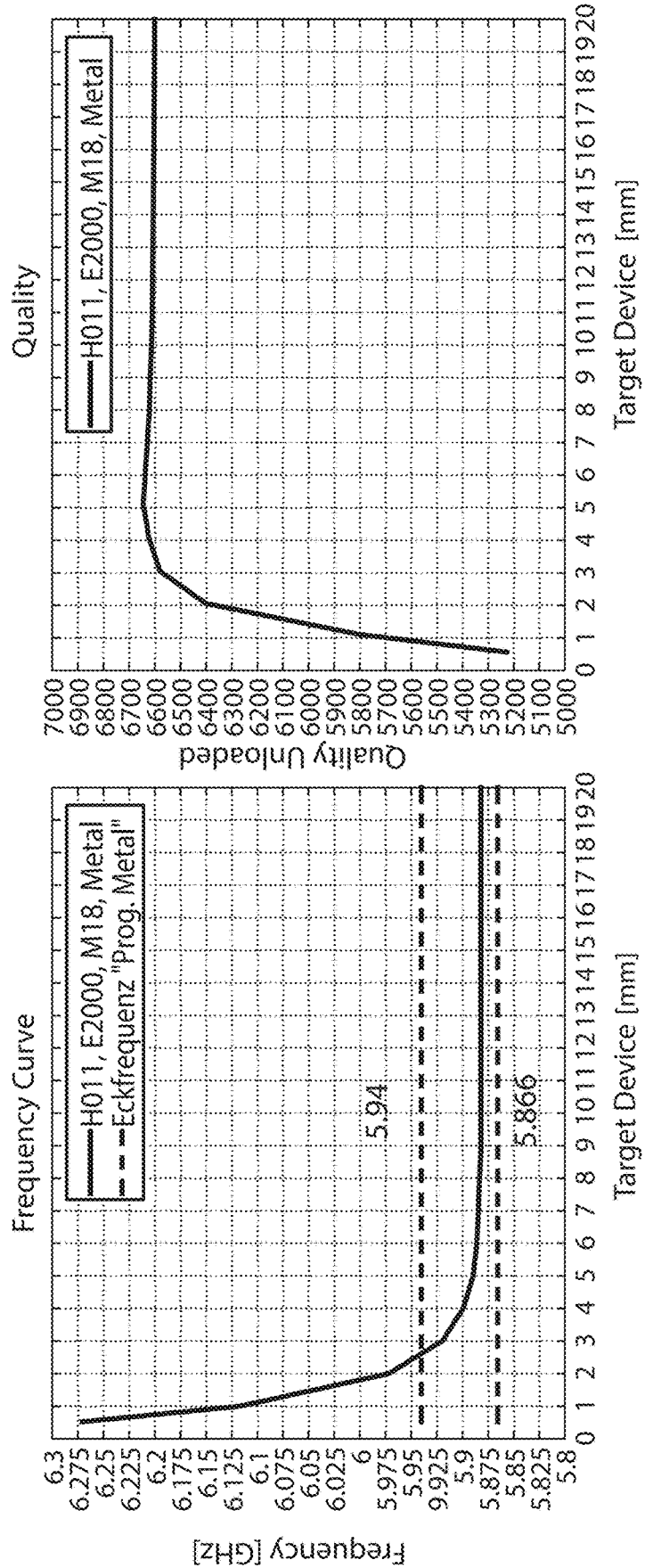

FIG. 10 illustrates the frequency and quality in the form of curves over the target distance.

Figure 11:
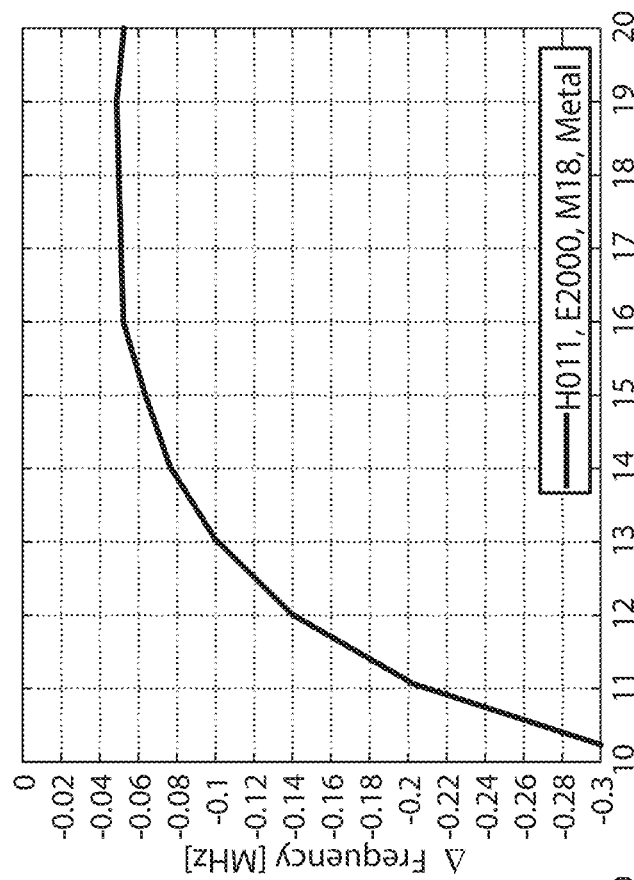
Figure 11:
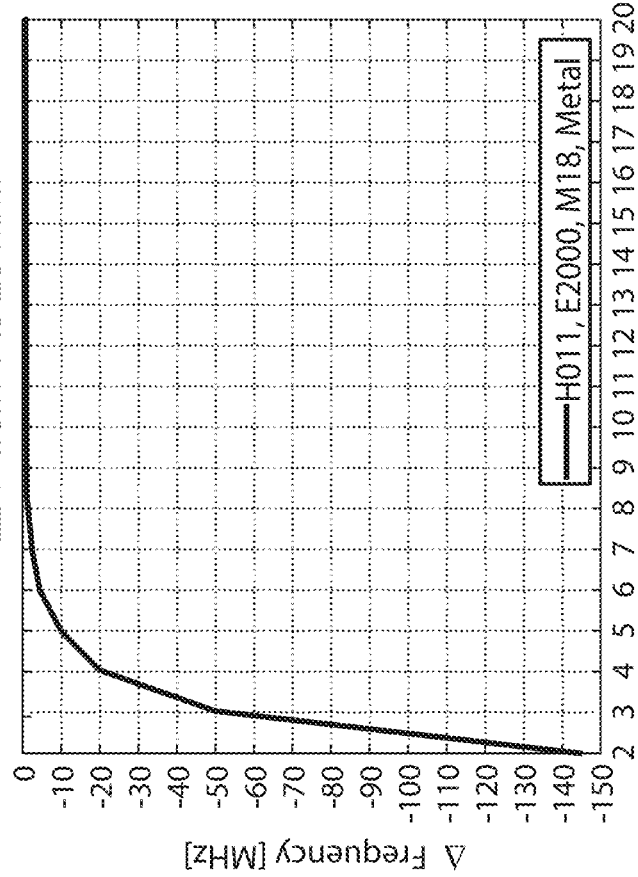

FIG. 11 illustrates frequency changes in the form of curves over the target distance.

Figure 12:
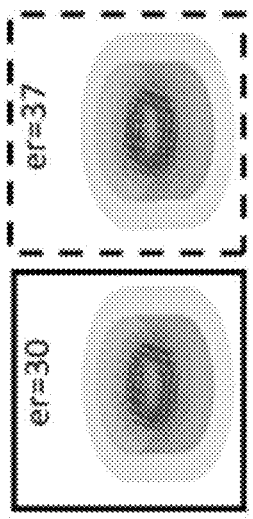
Figure 12:
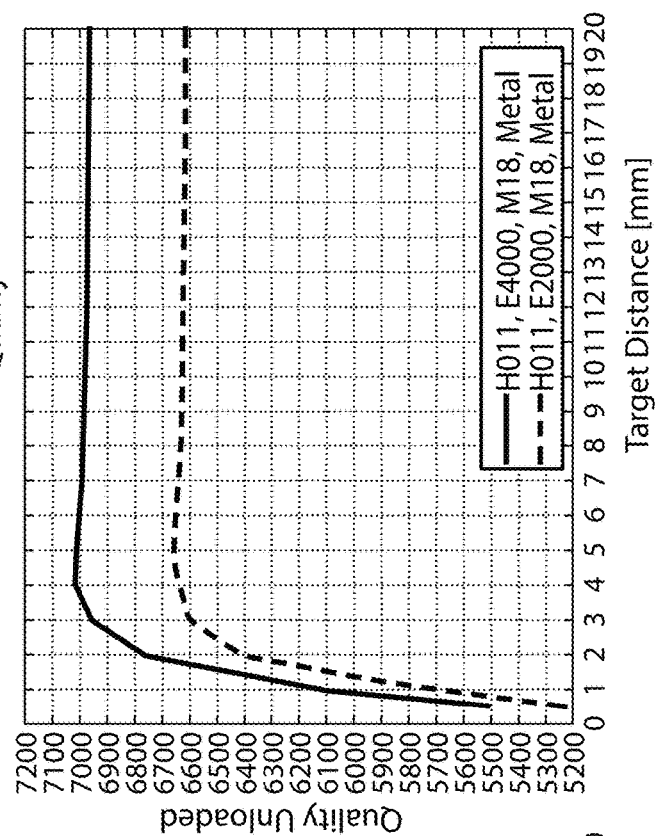
Figure 12:
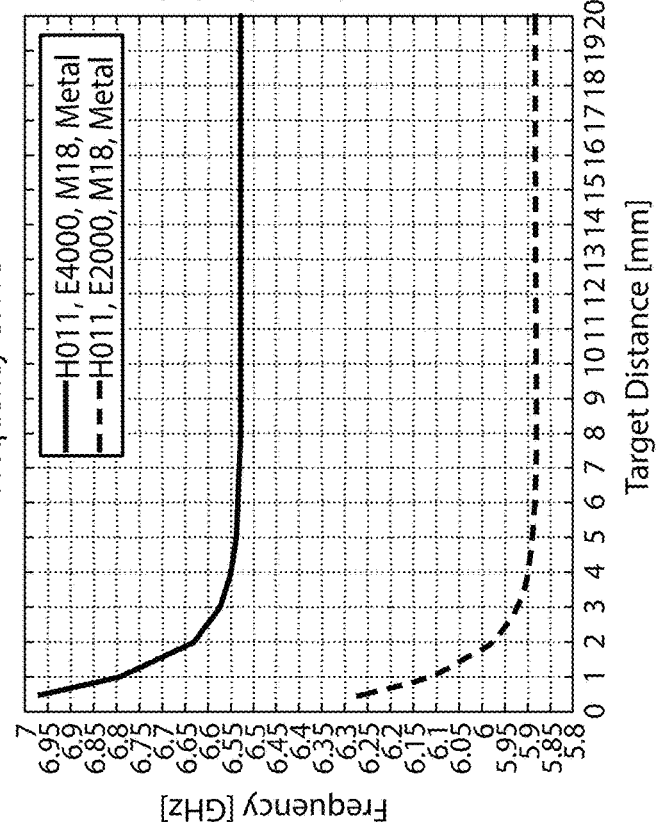

FIG. 12 relates to the change in permittivity in the form of frequency and quality curves over the target distance.

Figure 13:
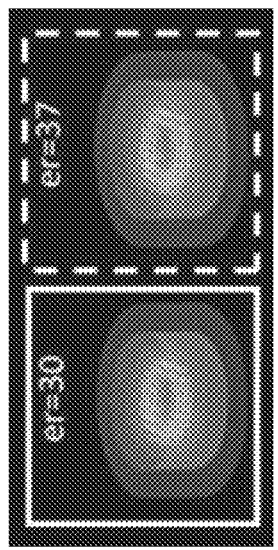
Figure 13:
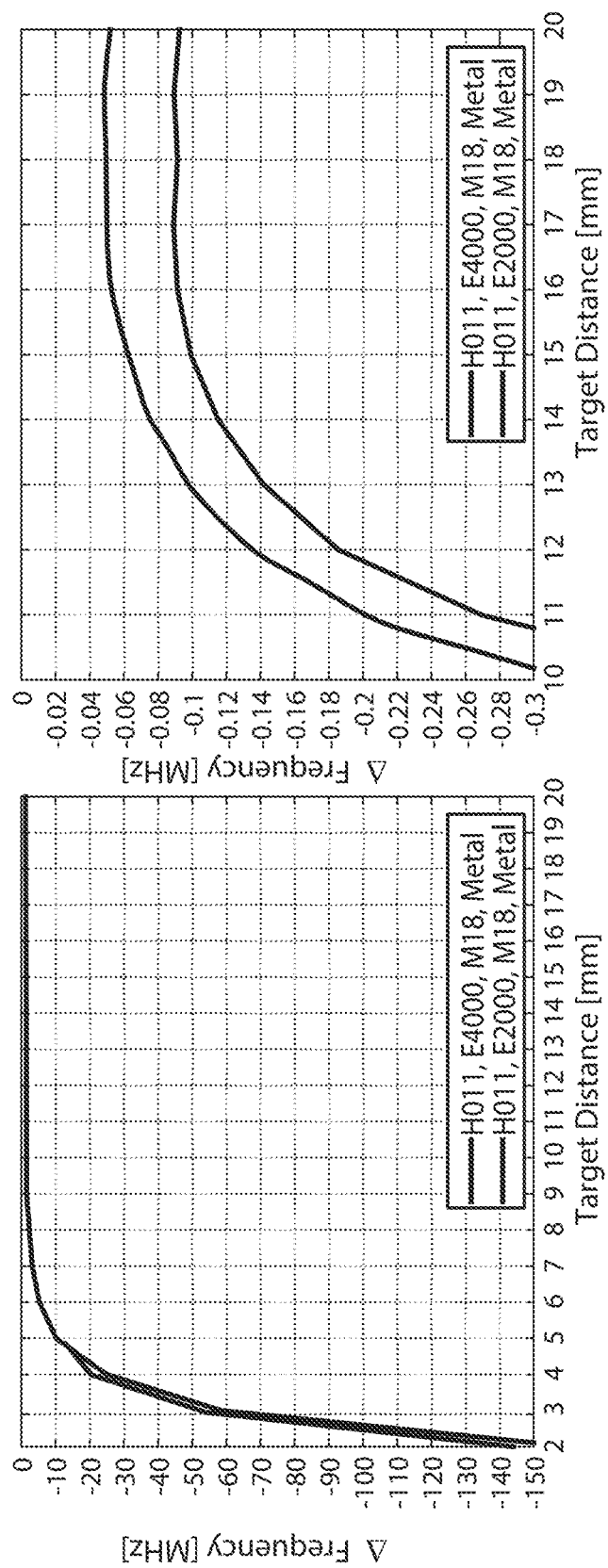

FIG. 13 shows the change in permittivity in the form of frequency change curves over the target distance.

Figure 14:
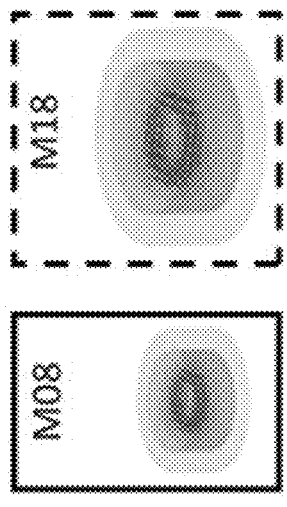
Figure 14:
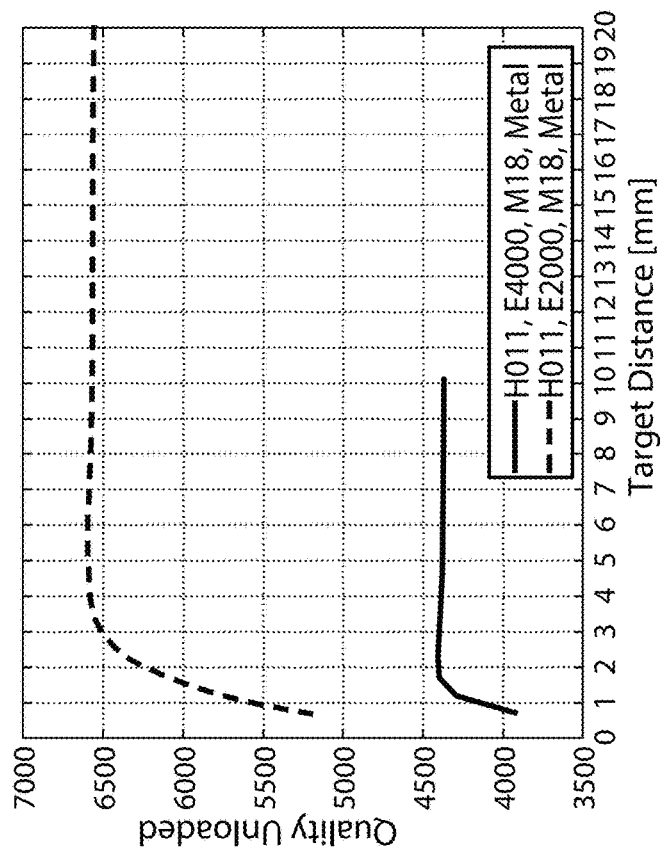
Figure 14:
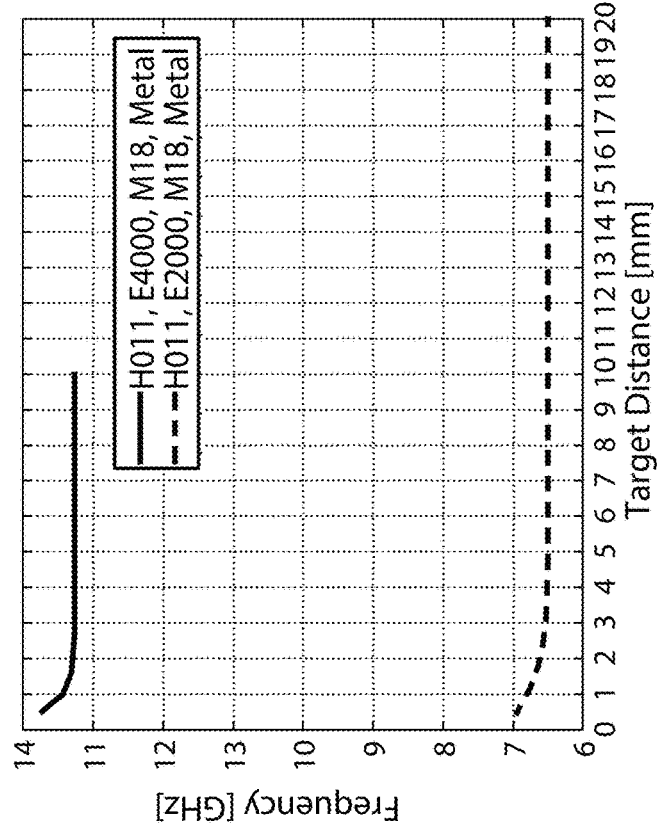

FIG. 14 illustrates effects when the sensor diameter is reduced as regards the frequency curve and quality curves over the target distance.

Figure 15:
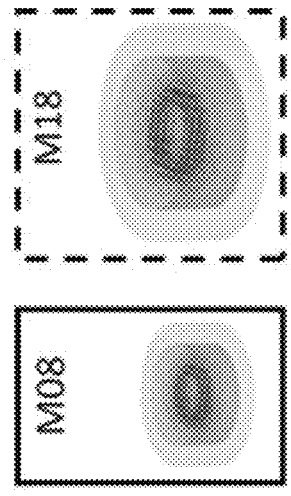
Figure 15:
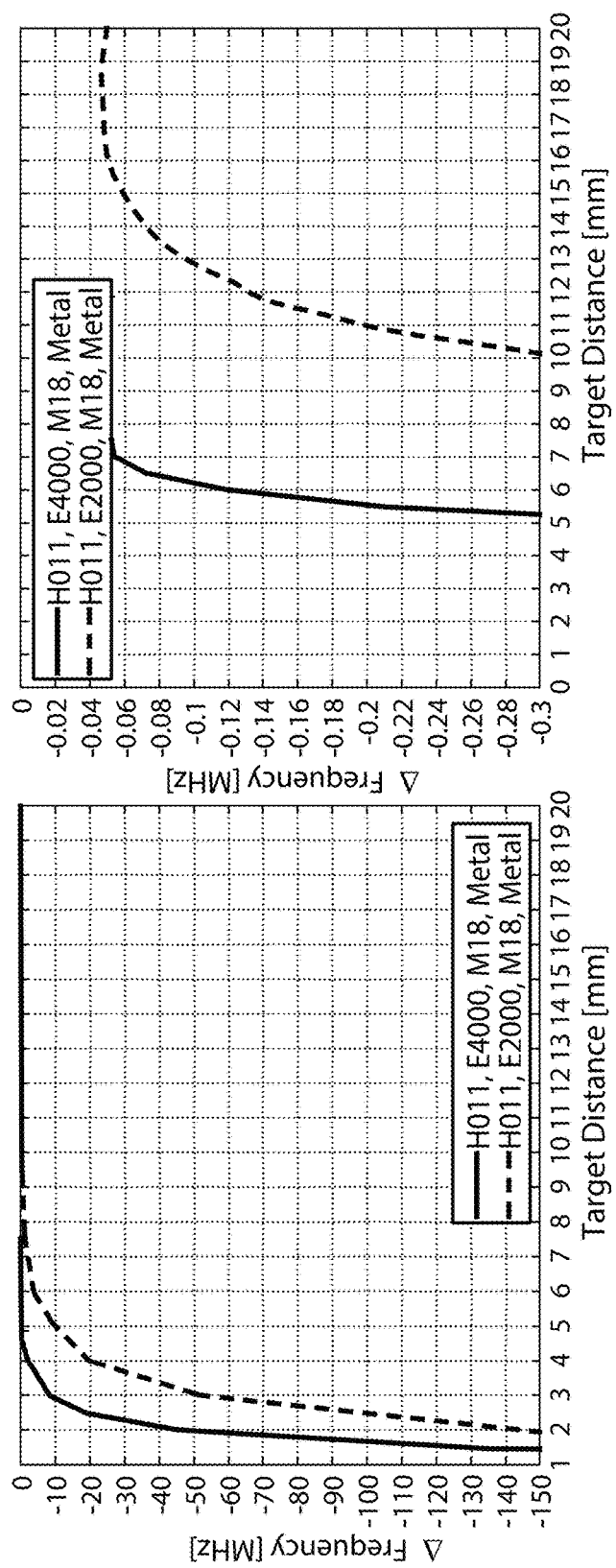

FIG. 15 illustrates effects when the sensor diameter is reduced as regards frequency changes over the target distance.

Figure 16:
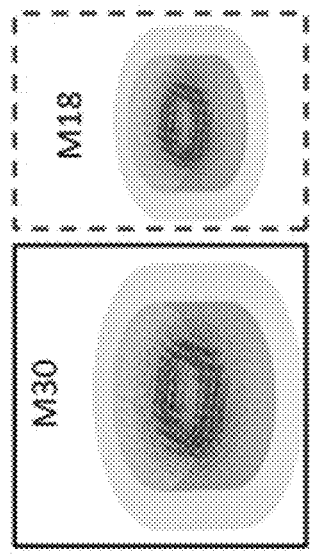
Figure 16:
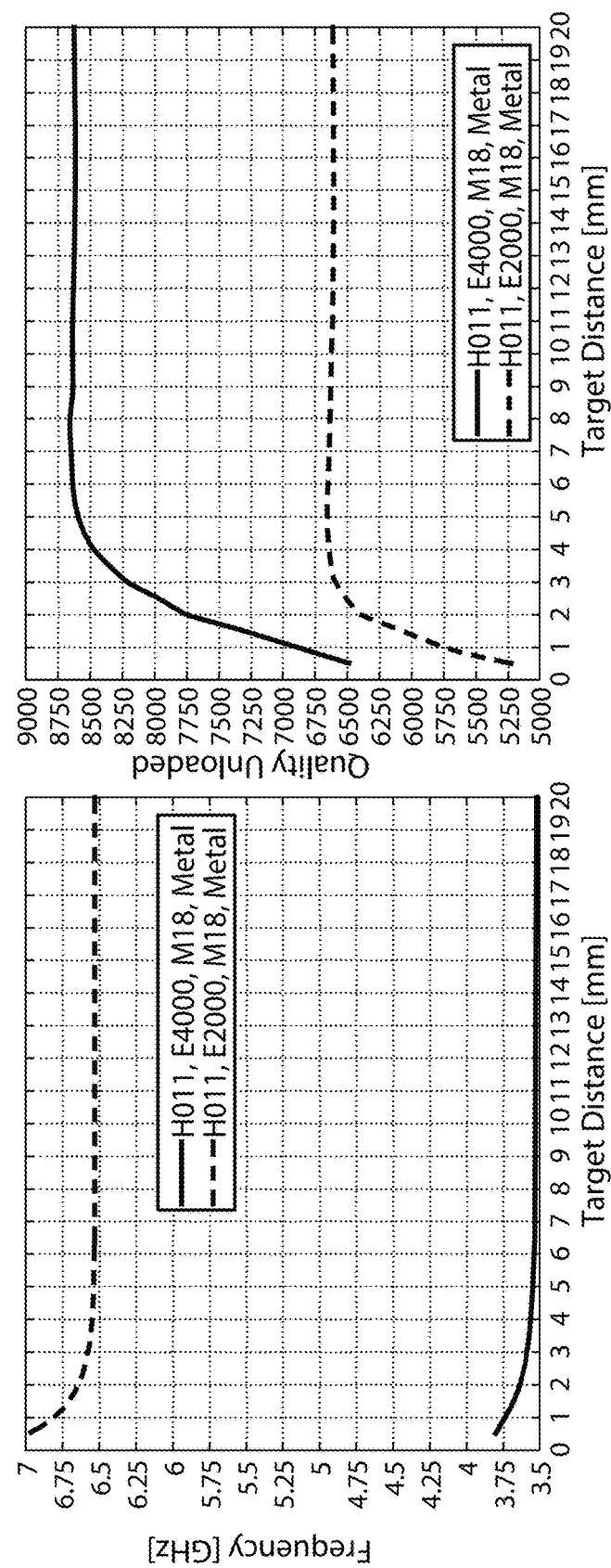

FIG. 16 illustrates effects when the sensor diameter is increased as regards the frequency curve and quality curve (unloaded) over the target distance.

Figure 17:
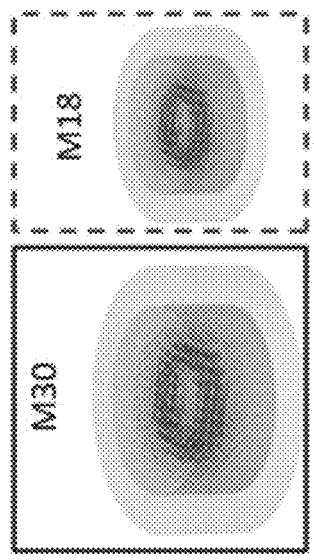
Figure 17:
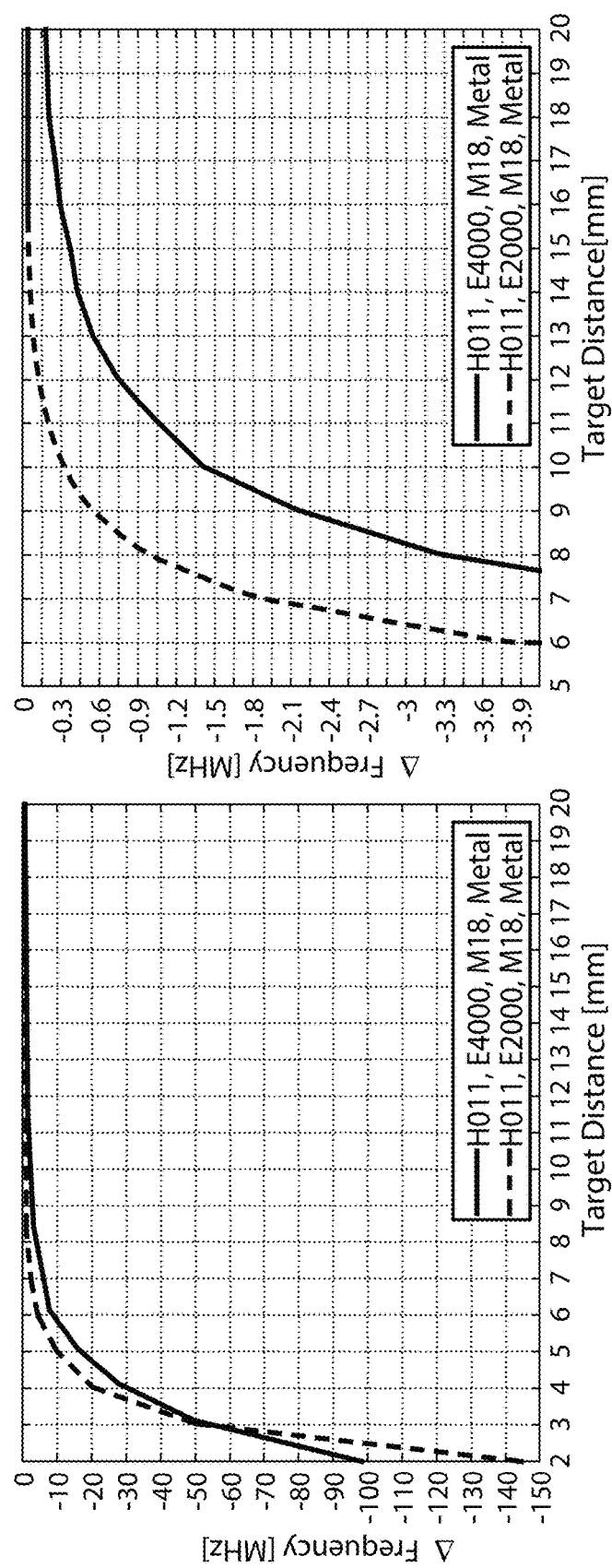

FIG. 17 illustrates effects when the sensor diameter is increased as regards frequency changes and modes.

Figure 18:
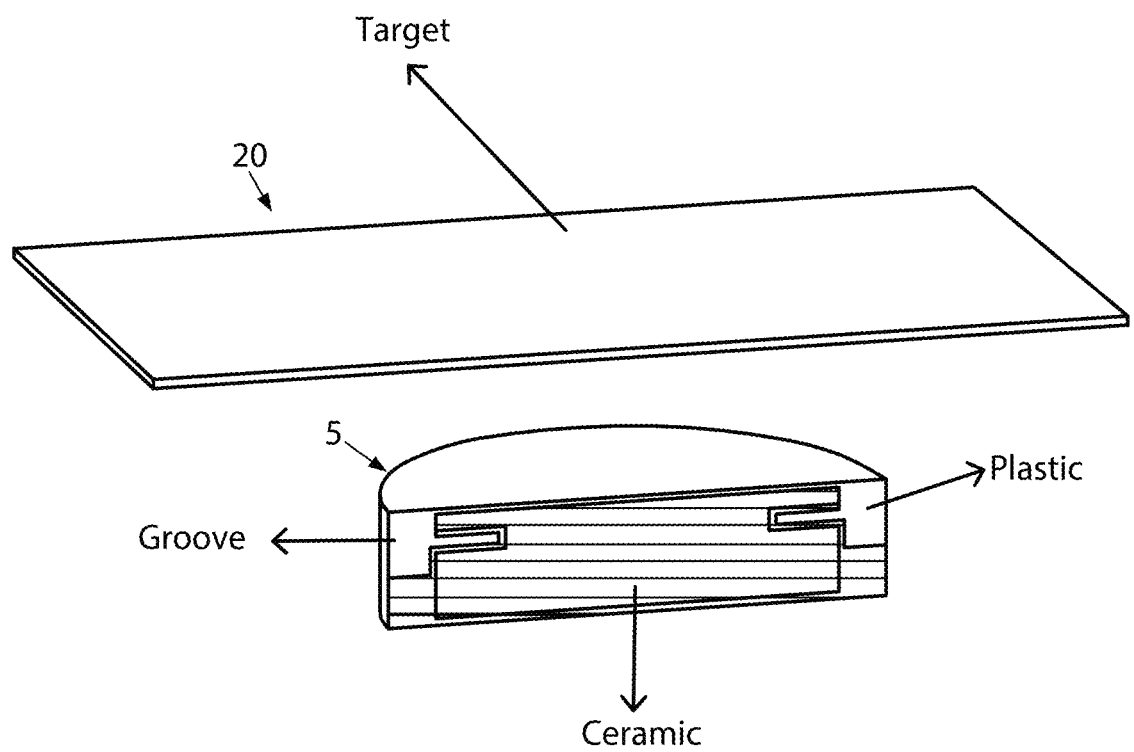

FIG. 18 shows a simulation model with the target and resonance structure for the H111/E110 mode.

Figure 19:
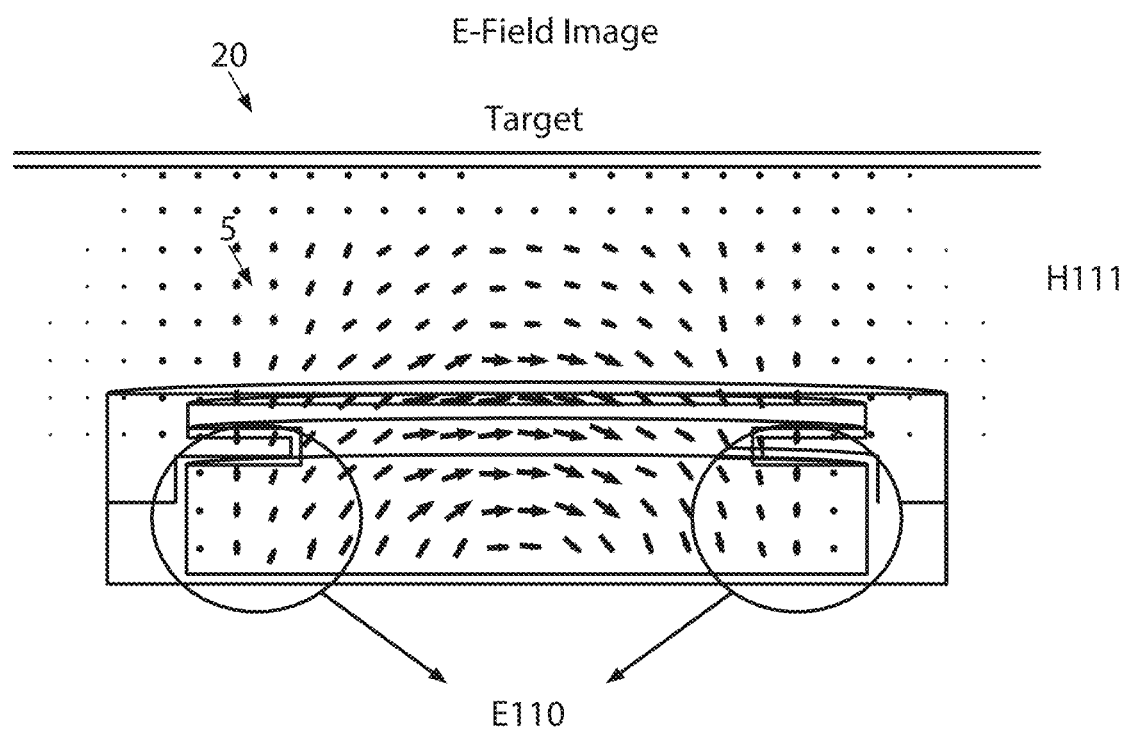

FIG. 19 shows a mode of operation in the form of the E-field image with the H111/E110 mode with the target and resonance structure.

Figure 20:
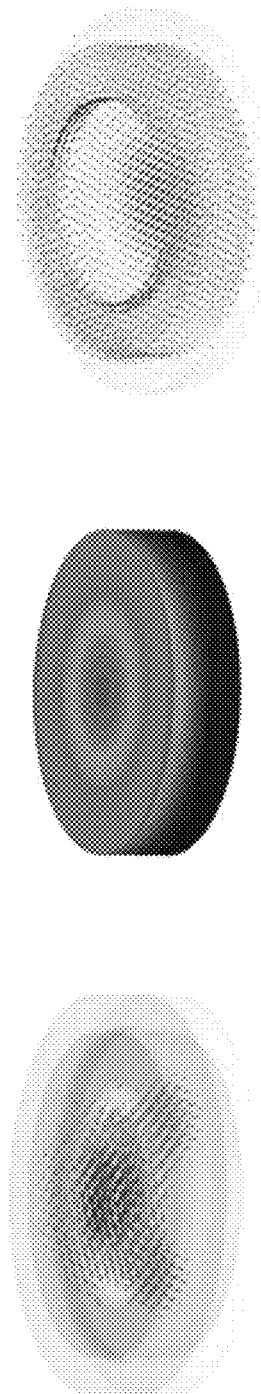

FIG. 20 shows mode formers for H111/E110 with E-field, electric energy density and surface current.

Figure 21:
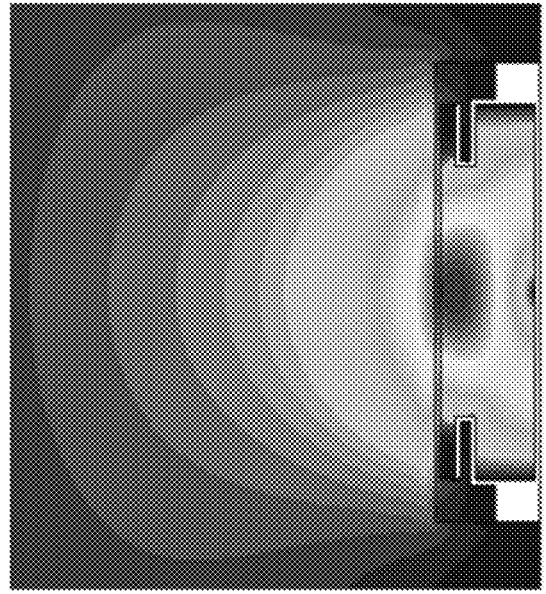
Figure 21:
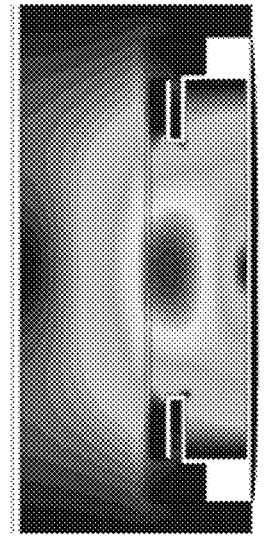

FIG. 21 shows cross-sections of the E-field with target distance 5 mm as an example or without a target.

Figure 22:
Figure 22:
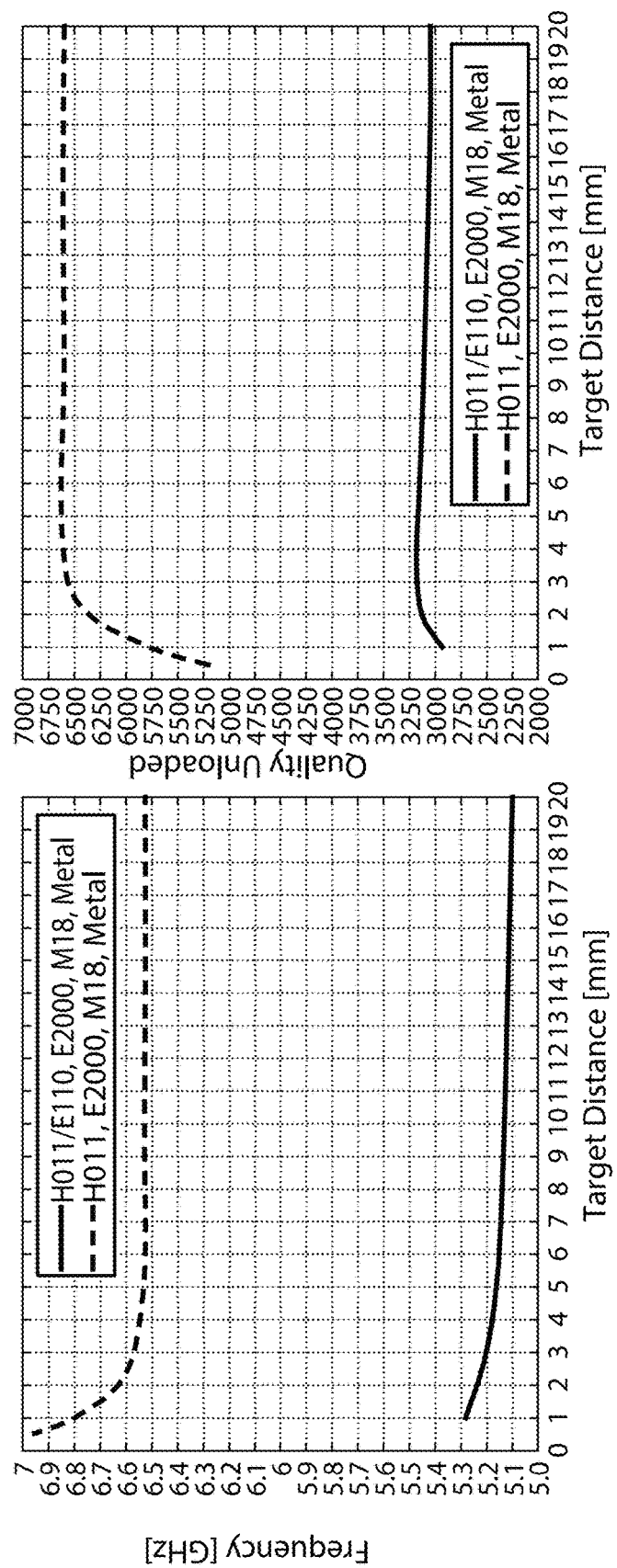

FIG. 22 illustrates a frequency curve and a quality curve (unloaded) over the target distance for the H111/E110 mode.

Figure 23:
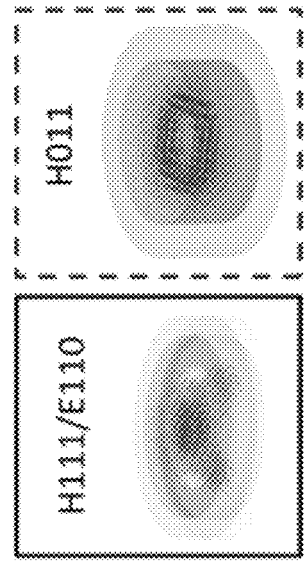
Figure 23:
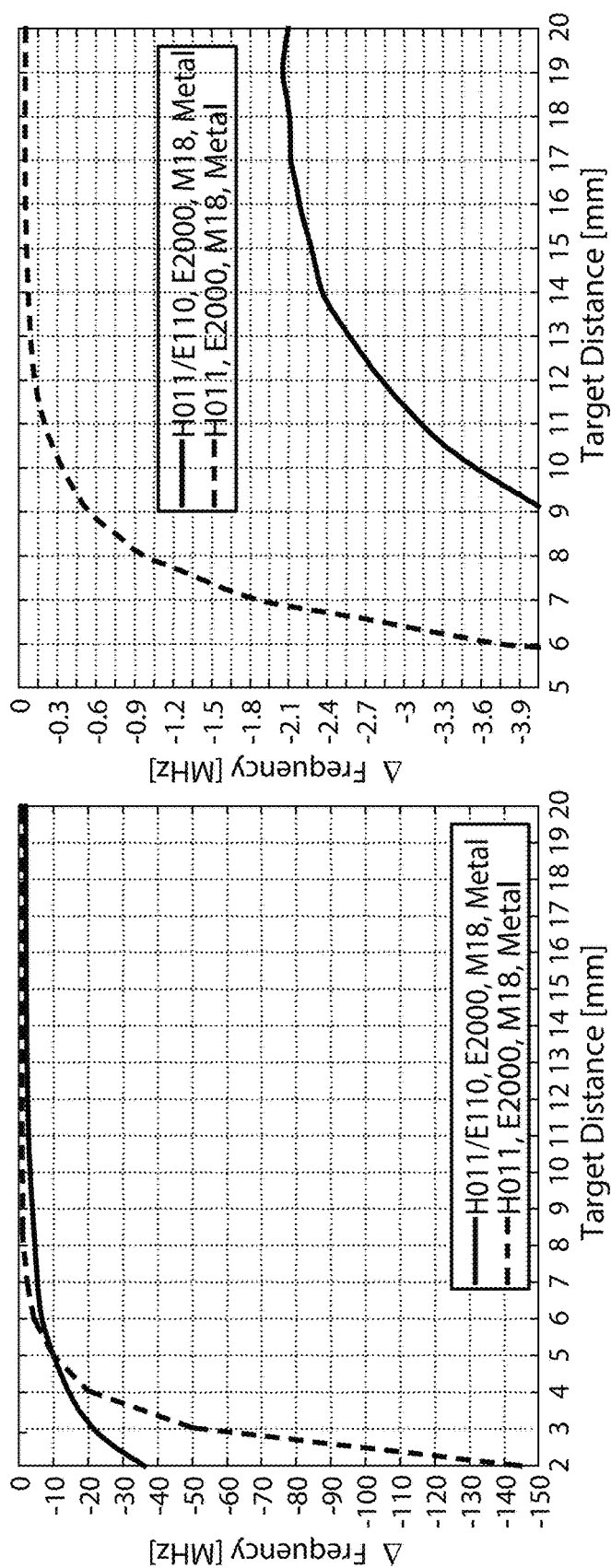

FIG. 23 illustrates frequency change curves over the target distance for the H111/E110 mode.

Since, moreover, these drawings can be understood in their own right and are suitable and are to be understood as independent disclosure, it is not necessary to provide a more detailed description of the latter.

The invention claimed is:

1. A distance measuring device for measuring a distance to a target object, comprising:
 a sensor comprising a resonance structure, a resonance chamber, a sleeve, and an electronic circuit coupled to the resonance structure,
 wherein the resonance structure has an element comprising a dielectric material, the element being an angular or cylindrical element and having a top surface, a bottom surface, and side surfaces perpendicular to the top surface and the bottom surface, the dielectric material comprises a narrowing at an edge of the dielectric material, and the element extends from a lower side to an upper side closest to the target object, a lower region of the element is at least partially metallized,
 wherein an injection molded plastic is positioned around an outer and/or an upper region of the element,
 wherein the resonance structure of the sensor is at least partially disposed within the sleeve such that the upper region of the element is located partially above the sleeve, and
 wherein a resonance frequency of the resonance chamber is dependent on a distance between the element and the target object and the electronic circuit is configured to couple an input signal into the resonance structure and couple an output signal out of the resonance structure when resonance is present and to determine, from an output signal from the resonance structure, the distance from the element to the target object based on a frequency of the output signal.

2. The device according to claim 1, wherein the narrowing of the dielectric material is circumferential and rotationally symmetrical.

3. The device according to claim 1, wherein the narrowing of the dielectric material defines a recess or a groove.

4. The device according to claim 1, wherein the narrowing of the dielectric material has a rectangular cross-section.

5. The device according to claim 1, wherein the narrowing of the dielectric material has a smaller cross-sectional area than an interior portion of the dielectric material.

6. The device according to claim 1, wherein the narrowing of the dielectric material has a height of 5% to 25% of a height of the element.

7. The device according to claim 1, wherein the narrowing of the dielectric material has a height of 10% to 20% of a height of the element.

8. The device according to claim 1, wherein the narrowing of the dielectric material has a height of approximately 15% of a height of the element.

9. The device according to claim 1, wherein the narrowing of the dielectric material has a height of 0.2 mm to 1.0 mm.

10. The device according to claim 1, wherein the narrowing of the dielectric material has a height of 0.5 mm to 0.7 mm.

11. The device according to claim 1, wherein the narrowing of the dielectric material has a height of approximately 0.6 mm.

12. The device according to claim 1, wherein the narrowing of the dielectric material has a depth of 5% to 25% of a width of the element.

13. The device according to claim 1, wherein the narrowing of the dielectric material has a depth of 10% to 20% of a width of the element.

14. The device according to claim 1, wherein the narrowing of the dielectric material has a depth of approximately 15% of a width of the element.

15. The device according to claim 1, wherein the narrowing of the dielectric material has a depth of 1.0 mm to 3.8 mm.

16. The device according to claim 1, wherein the narrowing of the dielectric material has a depth of 1.6 mm to 3.2 mm.

17. The device according to claim 1, wherein the narrowing of the dielectric material has a depth of approximately 2.4 mm.

18. The device according to claim 1, wherein the element extends from a lower side to an upper side closest to the target object, and the narrowing of the dielectric material is positioned in an upper third of the element.

19. The device according to claim 1, wherein the electronic circuit comprises a signal generator configured to generate a frequency-modulated input signal,
 wherein the device is configured to couple the input signal into the resonance structure at a first point on the resonance structure, and decouple the output signal from the resonance structure at a second point of the resonance structure with the given resonance.

20. The device according to claim 19, wherein the electronic circuit further comprises at least one of:
 a mixer configured to mix the output signal decoupled from the resonance structure into a baseband,
 an amplifier configured to amplify the output signal decoupled from the resonance structure,
 a filter configured to filter the output signal decoupled from the resonance structure, or
 an analog to digital converter configured to convert the output signal decoupled from the resonance structure from an analog signal to a digital signal.

21. The device according to claim 1, wherein the electronic circuit comprises:
 an oscillator configured generate an input signal coupled into the resonance structure and a local oscillator signal, and a mixer configured to receive the output signal decoupled from the resonance structure and the local oscillator signal.

22. The device according to claim 1, wherein the resonance structure is configured to be excited electrically and/or magnetically.

23. The device according to claim 1, wherein the resonance structure is geometrically arranged such that a spatial electromagnetic mode is formed in the resonance structure, wherein the mode is at least predominantly in the form of an transverse magnetic TM111 mode, a transverse electric TE011 mode, and/or a transverse electric TE111 mode.

24. The device according to claim 23, wherein the mode includes one or more distinct portions.

25. The device according to claim 1, wherein the narrowing of the dielectric material reduces circuit shorting compared to an interior portion of the element.

26. The device according to claim 1, wherein the resonator comprises at least two coupling points, and wherein the sensor has rotationally symmetrical sensor properties.

27. The device according to claim 26, wherein the at least two resonator coupling points are offset geometrically by 90°.

28. The device according to claim 26, wherein the device is configured to feed signals with a phase difference of 90° into the at least two resonator coupling points to produce a circulating mode in the resonance structure.

29. A method for measuring a distance to a target object, comprising:
providing a sensor comprising a resonance structure and a resonance chamber, wherein the resonance structure has an element comprising a dielectric material, the element being an angular or cylindrical element and having a top surface, a bottom surface, and side surfaces perpendicular to the top surface and the bottom surface, the dielectric material comprises a narrowing at an edge of the dielectric material, and the element extends from a lower side to an upper side closest to the target object, a lower region of the element is at least partially metallized,
wherein an injection molded plastic is positioned around an outer and/or an upper region of the element,
wherein the resonance structure of the sensor is at least partially disposed within the sleeve such that the upper region of the element is located partially above the sleeve, and
wherein a resonance frequency of the resonance chamber is dependent on a distance between the element and the target object;
coupling an input signal into the resonance structure;
coupling an output signal out of the resonance structure when a resonance is present; and
determining, from the output signal from the resonance structure, the distance between the element and the target object based on a frequency of the output signal.

30. The method according to claim 29, wherein the input signal is fed into the resonance structure at a first point of the resonance structure, and the output signal is decoupled from the resonance structure at a second point of the resonance restructure.

31. The method according to claim 29, wherein the resonance structure geometrically arranged such that a spatial electromagnetic mode is formed in the resonance structure, wherein the mode is at least predominantly in the form of a transverse magnetic TM111, a transverse electric TE011, and/or a transverse electric TE111 mode.

32. The method according to claim 29, wherein the sensor has a rotationally symmetrical sensor property.

33. The method according to claim 32, further comprising feeding signals with a phase difference into at least two resonator coupling points to produce a circulating mode in the resonance structure.

* * * * *